United States Patent
Woirhaye et al.

(10) Patent No.: US 8,635,699 B1
(45) Date of Patent: Jan. 21, 2014

(54) PERFORMANCE OPTIMIZATION FOR SCANNING OF DIGITAL CONTENT ON READ-ONLY OPTICAL MEDIA

(75) Inventors: Brendon Vincent Woirhaye, Whittier, CA (US); Joseph Chen, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 157 days.

(21) Appl. No.: 13/285,922

(22) Filed: Oct. 31, 2011

(51) Int. Cl.
*G06F 21/00* (2013.01)

(52) U.S. Cl.
USPC .......................................................... 726/24

(58) Field of Classification Search
None
See application file for complete search history.

(56) References Cited

U.S. PATENT DOCUMENTS

2002/0166064 A1* 11/2002 Harrison ........................ 713/200
2010/0138924 A1* 6/2010 Heim et al. ..................... 726/24

* cited by examiner

*Primary Examiner* — David Pearson
(74) *Attorney, Agent, or Firm* — Brill Law Office; Jeffrey Brill

(57) ABSTRACT

A collection of stored data concerning digital content on read-only optical media is maintained. The data collection comprises signatures identifying specific releases of digital content stored on optical media, and results of scanning the specific releases for malware. The coupling of optical media to a computing device is detected. In response, an identifying signature of the digital content on the optical medium is created, and the data collection is searched for the signature. Where the signature is found in the data collection, the stored scanning result for the corresponding digital content is retrieved. Instead of scanning the coupled optical medium, the retrieved scanning result is used to determine its malware infection status. Where the signature is not found in the data collection, the optical medium is scanned for malware.

20 Claims, 4 Drawing Sheets

PERFORMANCE OPTIMIZATION FOR SCANNING OF DIGITAL CONTENT ON READ-ONLY OPTICAL MEDIA

TECHNICAL FIELD

This disclosure pertains generally to scanning digital content, and more specifically to optimizing the scanning of digital content on read-only optical media.

BACKGROUND

Large amounts of computer data are stored on optical media, such as Compact Disks ("CD"), Digital Video Disks ("DVD") and Blue Ray Disks ("BD"). Software, digital photographs and sound files are frequently distributed on CDs and other optical media. Video typically ships on DVDs and BDs. Additionally, as storage capacity increases on modern optical media, publishers are using this additional capacity to ship applications and additional data along with video content. For example, a playback application might be included along with the video content on a DVD.

The access speed of optical media is orders of magnitude slower than that of magnetic media, due to the physical geometry of the optical media. Content is stored on optical media as a single continuous track which must be accessed sequentially. Thus, non-sequential access of a file stored on optical media involves scanning back and forth between non-sequential locations, which is inherently slow.

Security software scans files for signatures of known malware. This involves non-sequential access of the files being scanned. Conventional security software is not context aware, and scans to detect malware upon insertion of new media, including optical media, as well as when a file is launched from optical media. This requires non-sequential access of content on the optical media, which is slow and thus negatively impacts the user's experience.

It would be desirable to address these issues.

SUMMARY

A collection of stored data concerning digital content on read-only optical media is maintained, for example in a database. The collection of data comprises at least signatures identifying specific releases of specific digital content stored on optical media, and results of scanning the specific releases of specific digital content for malware. In order to maintain the data collection, specific releases of specific digital content stored on optical media can be obtained and scanned for malware. Identifying signatures of the specific releases of digital content stored on the optical media can also be created. The created signatures and malware scanning results for the specific releases of specific digital content stored on optical media are then stored in data collection.

The coupling of read-only optical media to a computing device is detected (for example, when a read-only optical disk is inserted in a drive). When this occurs, an identifying signature of the digital content on the optical medium is created, based on the digital content itself. The collection of stored data concerning digital content on read-only optical media is then searched for the created identifying signature. The identifying signature can be based on, for example, digital content stored on the optical medium which uniquely identifies a specific release of specific content. Where the created identifying signature is found in the collection of stored data, the stored scanning result for the digital content identified by the identifying signature is retrieved. Instead of scanning the coupled optical medium, the retrieved stored scanning result is used to determine the malware infection status of the coupled optical medium. If the retrieved stored scanning result indicates that the digital content identified by the found identifying signature is free of malware, then the coupled optical medium is trusted as being malware free. On the other hand, if the retrieved stored scanning result indicates that the digital content is infected with malware, the optical medium is accordingly treated as being infected.

Where a created identifying signature of digital content on a coupled read-only optical medium is not found in the collection of stored data, the digital content on the coupled optical medium is scanned for malware. In some embodiments, the created identifying signature of the digital content and the scanning results are stored in the data collection, so that the same content need not be scanned again in the future.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, which is defined by the claims.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
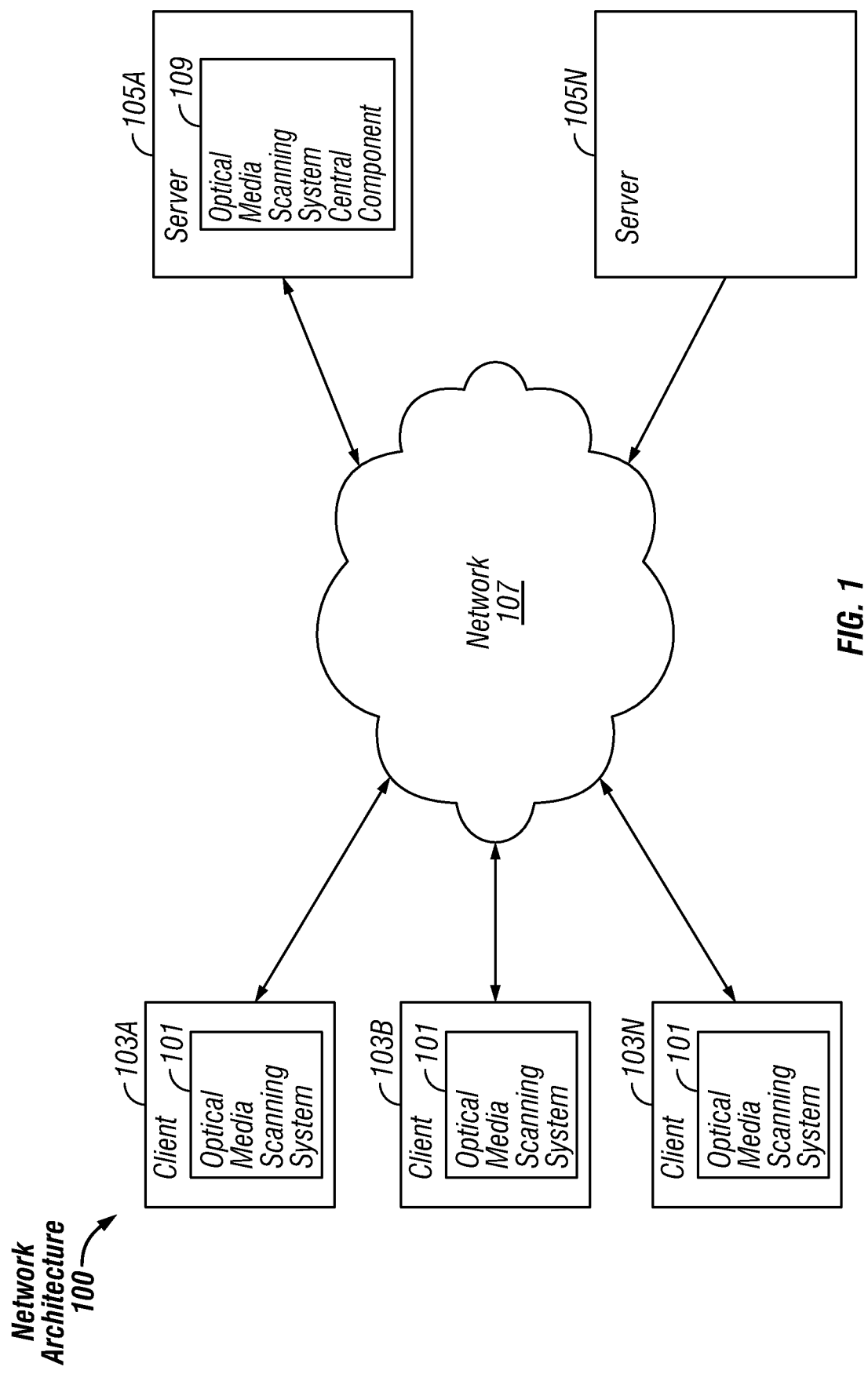
FIG. 1 is a block diagram of an exemplary network architecture in which an optical media scanning system can be implemented, according to some embodiments.

FIG. 1 is a block diagram illustrating an exemplary network architecture 100 in which an optical media scanning system 101 can be implemented. The illustrated network architecture 100 comprises multiple clients 103A, 103B and 103N, as well as multiple servers 105A and 105N. In FIG. 1, a separate optical media scanning system 101 is illustrated as residing on each client 103A-N, with a single optical media scanning system central component 109 on server 105A. It is to be understood that this is an example only, and in various embodiments various functionalities of this system 101 can be instantiated on a client 103, a server 105 or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
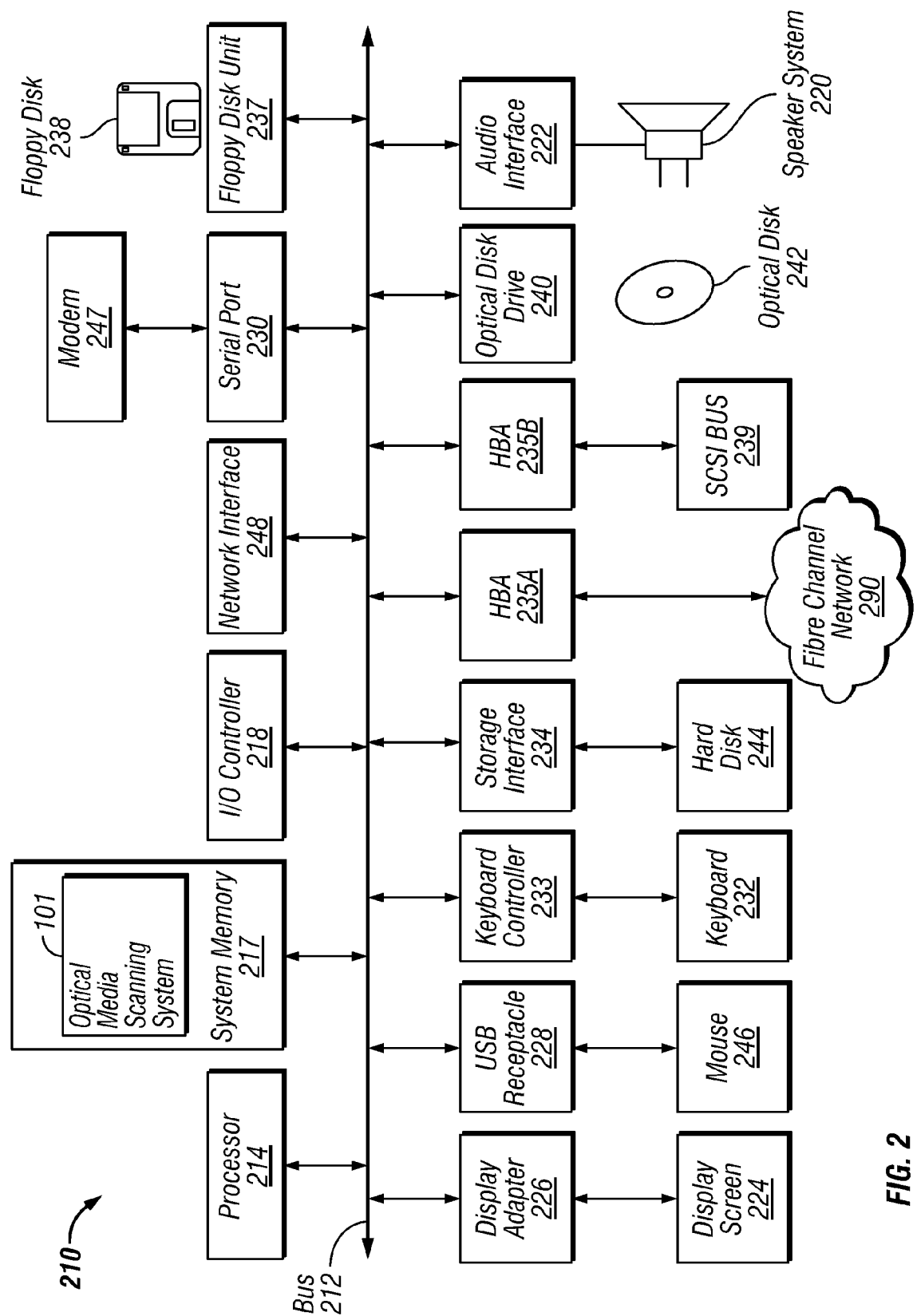
FIG. 2 is a block diagram of a computer system suitable for implementing an optical media scanning system, according to some embodiments.

FIG. 2 is a block diagram of a computer system 210 suitable for implementing an optical media scanning system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the optical media scanning system 101 is illustrated as residing in system memory 217. The workings of the optical media scanning system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the Internet. Such coupling can be wired or wireless.

Figure 3:
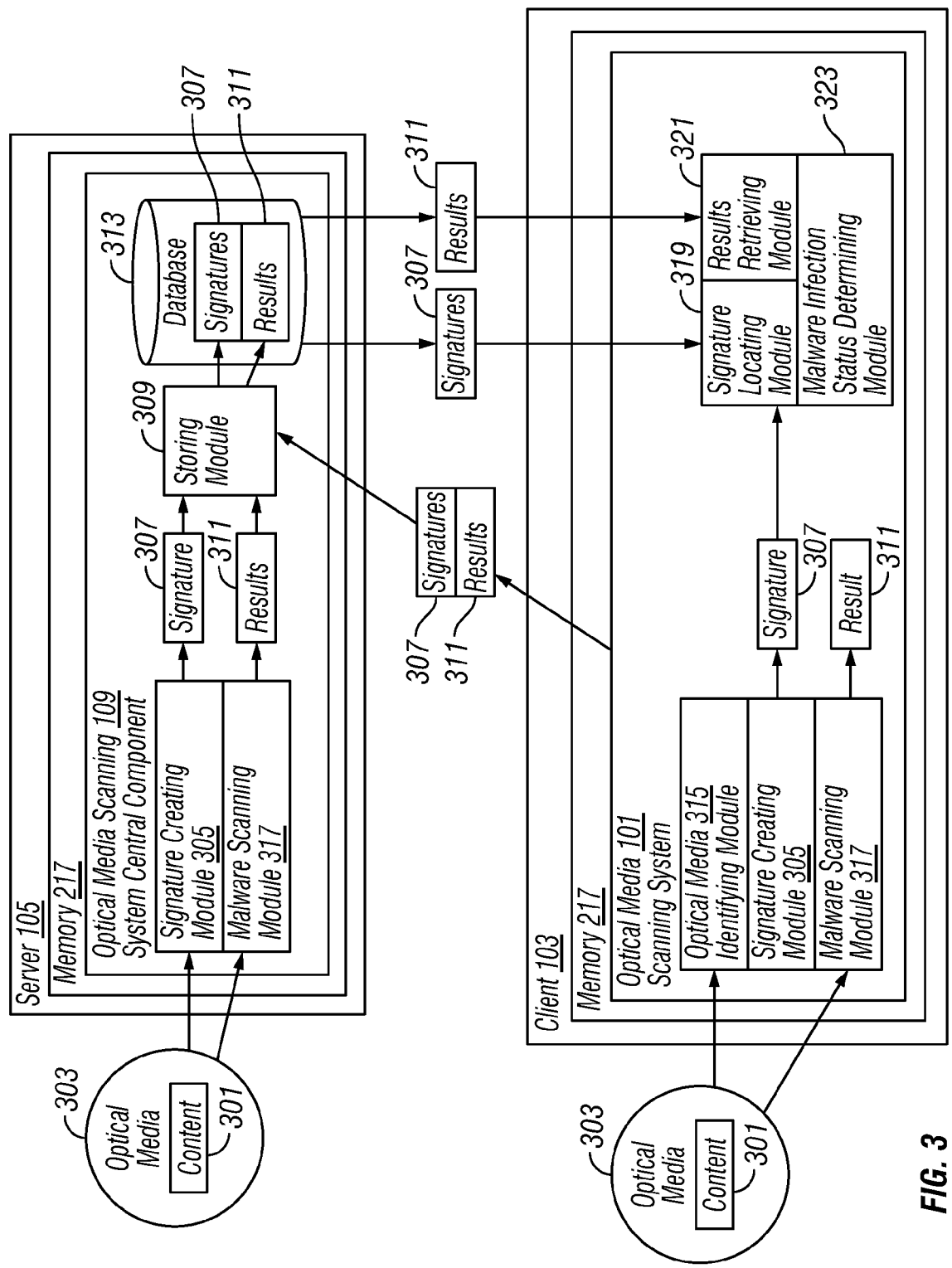
FIG. 3 is a block diagram of the operation of an optical media scanning system, according to some embodiments.

FIG. 3 illustrates the operation of an optical media scanning system 101 residing in the system memory 217 of a client computer 103, with an optical media scanning system central component 109 residing in the system memory of a server 105, according to some embodiments. As described above, the functionalities of the optical media scanning system 101, including the central component 109, can reside on a client 103, a server 105, or be distributed between multiple computer systems 210, including within a cloud-based computing environment in which the functionality of the optical media scanning system 101 is provided as a service over a network 107. It is to be understood that although the optical media scanning system 101 is illustrated in FIG. 3 as a single entity, the illustrated optical media scanning system 101 represents a collection of functionalities, which can be instantiated as a single module or as multiple modules as desired (an instantiation of specific, multiple modules of the optical media scanning system 101 is illustrated in FIG. 3). It is to be understood that the modules of the optical media scanning system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the optical media scanning system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, an optical media scanning system 101 can identify specific releases of digital content 301 on read-only optical media 303. For example, publishers release content 301 such as software, games, music and movies on read-only optical media 303. Multiple copies of specific content 301 (e.g., a specific version of a specific software product or game) are created from the same master copy and distributed on individual read-only optical disks 303. Each copy is identical, and can be assumed to be static because the optical disk 303 on which it is stored is read-only. For example, every copy of a specific version of a specific movie released on read-only DVD on a given date can be assumed to be the same.

For any given instantiation of content 301 stored on an optical medium 303, a signature creating module 305 of the optical media scanning system central component 109 can create an identifying signature 307. The signature creating module 305 creates these identifying signatures 307 based on the content 301 on the optical media 303. For example, the signature creating module 305 could create an identifying signature 307 of a specific release of a specific film on DVD based on information embedded in the content 301 such as the title, the version number, the publisher, the release date, the country of release, the language, the number of sectors on the media 303, etc. The specific identifying information to use to create an identifying signature 307 can vary between content storage formats and embodiments.

Because each copy of specific content 301 distributed on read-only optical media 303 can be assumed to be the same, once a single copy of a specific release has been scanned and adjudicated to be free of malware, every copy of the same content can be trusted. For example, if a copy of a specific release of a given movie on read-only BD is scanned for malware and determined to be benign, every other copy of the identical release can be assumed to be benign without being scanned.

Leveraging this logic, copies of releases of content 301 on optical media 303 are obtained, and an anti-malware scanning module 317 of the optical media scanning system central component 109 scans each obtained optical medium 303 for malware. In other words, specific releases of software, games, audio, video and other forms of digital content 301 on read-only optical media 303 are scanned for malware. This can include both obtaining and scanning new releases as well as back catalogue material. It is to be understood that in various embodiments, the anti-malware scanning module 317 can utilize various forms of anti-malware scanning, including both conventional and non-conventional techniques for the identification of malware in digital content.

When a specific release of digital content 301 is scanned for malware, the signature creating module 305 creates an identifying signature 307 for the content 301. For each unique release that is scanned, a storing module 309 of the optical media scanning system central component 109 stores the identifying signature 307 and the result 311 of the scanning operation (i.e., an indication as to whether the specific content 301 does or does not contain malware). The storing module 309 can store this data in a database 313 (or other suitable storage mechanism), for example a database 313 on a centrally located security server 105. Thus, a database 313 or other stored collection of data concerning digital content 301 on optical media 303 is maintained. By maintaining such a database 313 containing identifying signatures 307 and scanning results 311 for specific releases of digital content 301 on optical media 303, the optical media scanning system 101 is able to eliminate a significant amount of client side scanning of optical media 303.

More specifically, on the client side, an optical media identifying module 315 of the optical media scanning system 101 detects when an optical medium 303 is communicatively coupled to the computer 210 (e.g., when a user inserts a CD, DVD, BD or the like in a drive). The optical media identifying module 315 further determines whether the inserted optical medium 303 is read-only or not. If the inserted optical medium is not read-only, an anti-malware scanning module 317 of the optical media scanning system 101 scans the optical medium 303 for malware. This is so because a writeable optical medium cannot be assumed to have not been infected, even if it has been scanned previously. However, if the inserted optical medium 303 is read-only, a signature creating module 305 of the optical media scanning system 101 creates an identifying signature 307 for the content 301 on the optical medium 303.

A signature locating module 319 of the optical media scanning system 101 then searches the database 313 to attempt to locate the identifying signature 307 for the content 301 on the inserted optical medium 303. If the identifying signature 307 for the content 301 on the inserted optical medium 303 is in the database 313, that means that the particular release of content 301 on the inserted optical medium 303 has already been scanned for malware. In this case, the anti-malware scanning module 317 does not scan the optical medium 303 for malware. Instead, a results retrieving module 321 of the optical media scanning system 101 retrieves the results 311 for this content 301 from the database 313.

Because this particular release of content 301 on read-only optical media has already been scanned, it is not necessary to scan the inserted copy of the release. Instead, the scanning of the inserted optical medium 303 is omitted, and a malware infection status determining module 323 of the optical media scanning system 101 uses the stored scanning result 311 to determine if the content 301 on the inserted optical medium 303 is infected with malware. If the stored scanning result 311 indicates that the release of content 301 on the inserted optical medium 303 is free of malware, the infection status determining module 323 determines that the inserted optical medium 303 is malware free. On the other hand, if the stored scanning result 311 indicates that the content 301 is infected with malware, the inserted optical medium 303 is treated as being infected, and desired conventional or unconventional steps can be taken to protect the computer 210 accordingly (e.g., not executing any files on the infected optical medium 303, warning the user, reporting the infection to a central security server 105, etc.).

If the identifying signature 307 for the content 301 on the inserted optical medium 303 is not in the database 313, then the anti-malware scanning module 317 scans the optical medium 303 for malware. This is the case because the database 313 contains no record of having previously scanned the particular release of content 301 on the inserted optical medium 303 for malware. Therefore, it is not known whether or not the release of content 301 on the inserted optical medium 303 is infected or not.

In some embodiments, when the identifying signature 307 for the content 301 on the inserted optical medium 303 is not in the database 313, the optical media scanning system 101 can transmits the identifying signature 307 of the content 301 and the result 311 of the scanning operation to the optical media scanning system central component 109. In these embodiments, the database storing module 309 can then store the transmitted identifying signature 307 and scanning result 311 in the database 313, so that the particular release of content 301 need not be scanned again when encountered in the future.

The above-described operation of the optical media scanning system 101 eliminates the need to repeatedly scan separate copies of specific releases of digital content 301 on optical media 303 for malware. Because the scanning of optical media 303 is inherently slow, the use of the optical media scanning system 101 can result in a significant, noticeable performance improvement.

Figure 4:
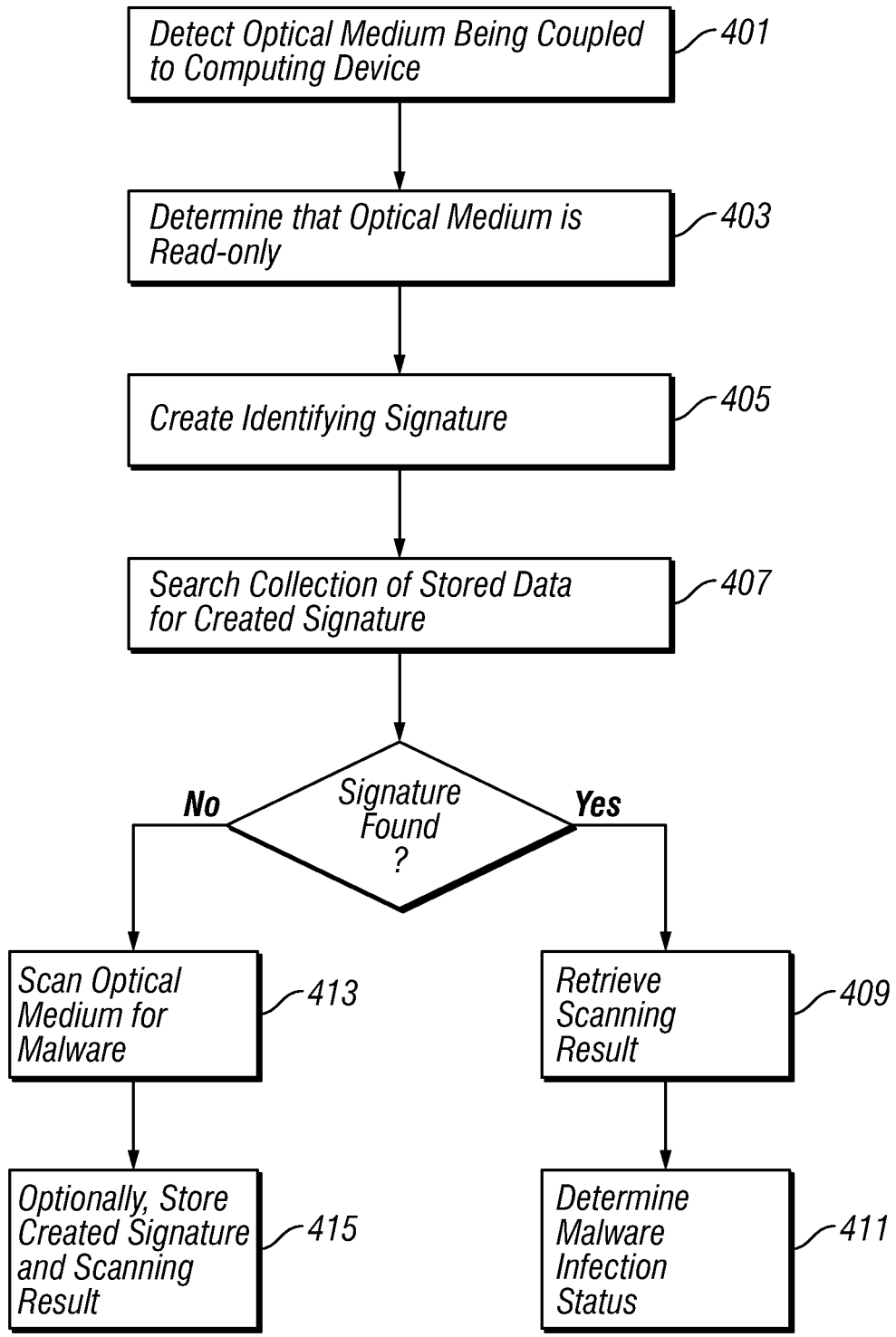
FIG. 4 is a flowchart of the operation of an optical media scanning system, according to some embodiments.

FIG. 4 illustrates steps of the operation of the optical media scanning system 101, according to some embodiments. The optical media identifying module 315 detects 401 that an optical medium 303 is being communicatively coupled to the computing device 210. The optical media identifying module 315 then determines 403 that the coupled optical medium 303 is read-only. The signature creating module 305 creates 405 an identifying signature 307 of the digital content 301 on the coupled optical medium 303. The signature locating module 319 searches 407 for the created identifying signature 307 in the database 313.

If the created signature 307 is found in the database 313, then the content 301 on the optical medium 303 has been scanned before, so the results retrieving module 321 retrieves 409 the scanning result 311 for this content 301 from the database 313. The malware infection status determining module 323 then determines 411 the malware infection status of the content 301 on the optical medium 303, based on the retrieved scanning result 311.

On the other hand, if the signature 307 of the content 301 on the optical medium 303 is not found in the database 313, then there is no record of this content 301 having been scanned before. Therefore, the anti-malware scanning module 317 scans 413 the optical medium 303 for malware. In some embodiments, the storing module 309 stores 415 the signature 307 and scanning result 311 in the database 313, to add a record of this particular content 301.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for optimizing scanning of digital content on read-only optical media, at least a portion of the method being performed by a computing device comprising at least one processor, the method comprising the steps of:
    detecting an optical medium being communicatively coupled to a computing device;
    determining whether the coupled optical medium is read-only;
    responsive to determining that the coupled optical medium is read-only:
        creating an identifying signature of the digital content on the coupled optical medium, based on the digital content thereon;
        searching a collection of stored data concerning digital content on read-only optical media for the created identifying signature;
        finding the created identifying signature in the collection of stored data concerning digital content on read-only optical media;
        responsive to finding the created identifying signature in the collection of stored data concerning digital content on read-only optical media, retrieving, from the collection of stored data, a stored scanning result for digital content identified by the found identifying signature; and
        instead of scanning the coupled optical medium, using the retrieved stored scanning result to determine a malware infection status of the coupled optical medium; and
    responsive to determining that the coupled optical medium is not read-only:
        scanning the optical medium to determine the malware infection status of the coupled optical medium.

2. The method of claim 1 further comprising:
    responsive to the retrieved stored scanning result indicating that the digital content identified by the found identifying signature is free of malware, trusting the coupled optical medium to be free of malware.

3. The method of claim 1 further comprising:
    responsive to the retrieved stored scanning result indicating that the digital content identified by the found identifying signature is free of malware, determining that a specific release of specific digital content stored on the optical medium has been previously scanned and adjudicated to be free of malware.

4. The method of claim 1 further comprising:
    responsive to the retrieved stored scanning result indicating that the digital content identified by the found identifying signature is infected with malware, treating the coupled optical medium as being infected with malware.

5. The method of claim 1 further comprising:
    responsive to the retrieved stored scanning result indicating that the digital content identified by the found identifying signature is infected with malware, determining that a specific release of specific digital content stored on the optical medium has been previously scanned and adjudicated to be infected with malware.

6. The method of claim 1 further comprising:
    detecting a second read-only optical medium being communicatively coupled to the computing device;
    creating an identifying signature of the digital content on the second coupled optical medium, based on the digital content thereon;
    searching the collection of stored data concerning digital content on read-only optical media for the created identifying signature of the digital content on the second coupled optical medium;
    not finding the created identifying signature of the digital content on the second coupled optical medium in the collection of stored data concerning digital content on read-only optical media; and
    responsive to not finding the created identifying signature of the digital content on the second coupled optical medium, scanning the second coupled optical medium for malware.

7. The method of claim 6 further comprising:
    storing the identifying signature of the digital content on the second coupled optical medium in the collection of stored data concerning digital content on read-only optical media; and
    storing a scanning result for the scanning for malware of the second coupled optical medium in the collection of stored data concerning digital content on read-only optical media.

8. The method of claim 1 wherein creating an identifying signature of the digital content on the coupled optical medium, based on the digital content thereon further comprises:
    creating the identifying signature of the digital content based on digital content stored on the optical medium, the stored digital content uniquely identifying a specific release of specific content.

9. The method of claim 1 wherein detecting an optical medium being communicatively coupled to a computing device further comprises:
    detecting an optical medium being inserted in a drive of the computing device.

10. The method of claim 1 further comprising:
    maintaining a collection of stored data concerning digital content on read-only optical media, the maintained collection comprising identifying signatures of specific releases of specific digital content stored on optical media, and results of scanning the specific releases of specific digital content for malware.

11. The method of claim 10 further comprising:
obtaining specific releases of specific digital content stored on optical media;
creating identifying signatures of the specific releases of digital content stored on the optical media;
scanning the specific releases of digital content stored on the optical media for malware; and
storing the created signatures and malware scanning results for the specific releases of specific digital content stored on optical media in the maintained collection of stored data.

12. At least one non-transitory computer readable medium containing a computer program product for optimizing scanning of digital content on read-only optical media, the computer program product comprising:
program code for detecting an optical medium being communicatively coupled to a computing device;
program code for determining whether the coupled optical medium is read-only;
responsive to determining that the coupled optical medium is read-only:
program code for creating an identifying signature of the digital content on the coupled optical medium, based on the digital content thereon;
program code for searching a collection of stored data concerning digital content on read-only optical media for the created identifying signature;
program code for finding the created identifying signature in the collection of stored data concerning digital content on read-only optical media;
program code for, responsive to finding the created identifying signature in the collection of stored data concerning digital content on read-only optical media, retrieving, from the collection of stored data, a stored scanning result for digital content identified by the found identifying signature; and
program code for, instead of scanning the coupled optical medium, using the retrieved stored scanning result to determine a malware infection status of the coupled optical medium; and
responsive to determining that the coupled optical medium is not read-only:
program code for scanning the optical medium to determine the malware infection status of the coupled optical medium.

13. The computer readable medium of claim 12 further comprising:
program code for, responsive to the retrieved stored scanning result indicating that the digital content identified by the found identifying signature is free of malware, trusting the coupled optical medium to be free of malware.

14. The computer readable medium of claim 12 further comprising:
program code for, responsive to the retrieved stored scanning result indicating that the digital content identified by the found identifying signature is infected with malware, treating the coupled optical medium as being infected with malware.

15. The computer readable medium of claim 12 further comprising:
program code for, responsive to the retrieved stored scanning result indicating that the digital content identified by the found identifying signature is infected with malware, determining that a specific release of specific digital content stored on the optical medium has been previously scanned and adjudicated to be infected with malware.

16. The computer readable medium of claim 12 further comprising:
program code for detecting a second read-only optical medium being communicatively coupled to the computing device;
program code for creating an identifying signature of the digital content on the second coupled optical medium, based on the digital content thereon;
program code for searching the collection of stored data concerning digital content on read-only optical media for the created identifying signature of the digital content on the second coupled optical medium;
program code for not finding the created identifying signature of the digital content on the second coupled optical medium in the collection of stored data concerning digital content on read-only optical media; and
program code for responsive to not finding the created identifying signature of the digital content on the second coupled optical medium, scanning the second coupled optical medium for malware.

17. The computer readable medium of claim 16 further comprising:
program code for storing the identifying signature of the digital content on the second coupled optical medium in the collection of stored data concerning digital content on read-only optical media; and
program code for storing a scanning result for the scanning for malware of the second coupled optical medium in the collection of stored data concerning digital content on read-only optical media.

18. The computer readable medium of claim 12 wherein the program code for creating an identifying signature of the digital content on the coupled optical medium, based on the digital content thereon further comprises:
program code for creating the identifying signature of the digital content based on digital content stored on the optical medium, the stored digital content uniquely identifying a specific release of specific content.

19. The computer readable medium of claim 12 wherein the program code for detecting an optical medium being communicatively coupled to a computing device further comprises:
program code for detecting an optical medium being inserted in a drive of the computing device.

20. A computer system for optimizing scanning of digital content on read-only optical media, the computer system comprising:
at least one processor;
computer memory;
an optical media identifying module, residing in the computer memory, for detecting an optical medium being communicatively coupled to a computing device and for determining whether the coupled optical medium is read-only;
responsive to determining that the coupled optical medium is read-only:
a signature creating module, residing in the computer memory, for creating an identifying signature of the digital content on the coupled optical medium, based on the digital content thereon;
a signature locating module residing in the computer memory, for searching a collection of stored data concerning digital content on read-only optical media for the created identifying signature and finding the created identifying signature in the collection of stored data concerning digital content on read-only optical media;
a results retrieving module, residing in the computer memory, for, responsive to finding the created identifying signature in the collection of stored data concerning digital content on read-only optical media, retrieving, from the collection of stored data, a stored scanning result for digital content identified by the found identifying signature; and
a malware infection status determining module, residing in the computer memory, for, instead of scanning the coupled optical medium, using the retrieved stored scanning result to determine a malware infection status of the coupled optical medium; and
responsive to determining that the coupled optical medium is not read-only:
a malware scanning module, residing in the computer memory, for scanning the optical medium to determine the malware infection status of the coupled optical medium.

* * * * *